United States Patent
Whelan

(10) Patent No.: US 12,240,367 B2
(45) Date of Patent: Mar. 4, 2025

(54) STORAGE COMPARTMENT FOR RENTAL GOLF CART

(71) Applicant: Darin Whelan, Fort Lauderdale, FL (US)

(72) Inventor: Darin Whelan, Fort Lauderdale, FL (US)

(*) Notice: Subject to any disclaimer, the term of this patent is extended or adjusted under 35 U.S.C. 154(b) by 176 days.

(21) Appl. No.: 17/663,206

(22) Filed: May 12, 2022

(65) Prior Publication Data

US 2022/0362642 A1 Nov. 17, 2022

Related U.S. Application Data

(60) Provisional application No. 63/201,770, filed on May 12, 2021.

(51) Int. Cl.
| | | |
|---|---|---|
| *B60N 3/10* | (2006.01) | |
| *B60P 3/025* | (2006.01) | |
| *F25D 11/00* | (2006.01) | |
| *G07F 9/02* | (2006.01) | |
| *G07F 9/10* | (2006.01) | |

(52) U.S. Cl.
CPC ............ *B60N 3/104* (2013.01); *B60P 3/0257* (2013.01); *F25D 11/003* (2013.01); *F25D 2331/8013* (2013.01); *F25D 2400/12* (2013.01); *F25D 2500/06* (2013.01); *G07F 9/026* (2013.01); *G07F 9/10* (2013.01)

(58) Field of Classification Search
CPC ........... F25D 11/003; F25D 2331/8013; F25D 2400/12; F25D 2500/06; B60N 3/104; B60P 3/0257; G07F 9/026; G07F 9/10; G07F 17/12; B60H 1/00407

See application file for complete search history.

(56) References Cited

U.S. PATENT DOCUMENTS

| | | | |
|---|---|---|---|
| 5,975,390 A | 11/1999 | Saroli | |
| 6,321,926 B1 | 11/2001 | Allen | |
| 6,435,293 B1* | 8/2002 | Williams | ........... B60H 1/00407 62/323.3 |
| 6,457,317 B1* | 10/2002 | O'Donnell | ........... G06Q 20/203 705/22 |
| 6,601,745 B2 | 8/2003 | Tyrer | |
| 7,418,311 B1 | 8/2008 | Lagassey et al. | |
| 7,907,054 B1* | 3/2011 | Nguyen | ............... G06Q 20/203 340/3.1 |
| 8,844,994 B2 | 9/2014 | White et al. | |

(Continued)

*Primary Examiner* — Joseph F Trpisovsky
(74) *Attorney, Agent, or Firm* — Allen F. Bennett; Bennett Intellectual Property

(57) ABSTRACT

A rental golf cart includes a permanent or removeable storage container having one or more climate-controlled interior compartments. The storage container may be powered by an internal battery, the golf carts, or both. Access to the climate-controlled interior compartments may be controlled by a control panel or sensors in a handle to the compartment. The container may also include a video camera as well as a visual display. The removable storage container may be removably attached to an ancillary docking station which may be used to replace retail items removed from the storage container during rental of the golf cart. Sensors within the interior compartments may detect when retail items are inserted and removed from the storage compartment.

16 Claims, 5 Drawing Sheets

(56) References Cited

U.S. PATENT DOCUMENTS

| | | | |
|---|---|---|---|
| 2003/0000983 A1* | 1/2003 | Tyrer | B60N 2/24 |
| | | | 224/572 |
| 2007/0050271 A1 | 3/2007 | Ufford et al. | |
| 2007/0235482 A1 | 10/2007 | Laborie et al. | |
| 2012/0139335 A1* | 6/2012 | Holland | B60L 53/16 |
| | | | 307/9.1 |
| 2016/0009211 A1 | 1/2016 | Dao et al. | |
| 2016/0162715 A1* | 6/2016 | Luk | F25D 29/00 |
| | | | 235/385 |
| 2021/0256791 A1* | 8/2021 | Friend | G07F 9/026 |
| 2023/0419240 A1* | 12/2023 | Aalto | G06Q 10/0832 |

* cited by examiner

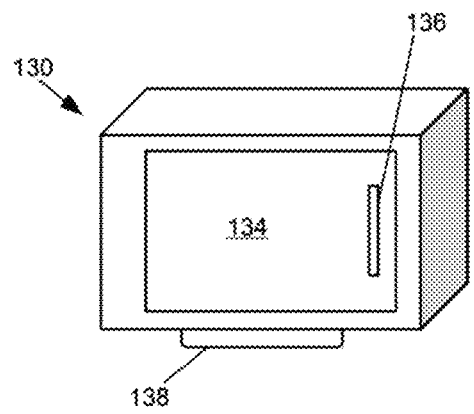
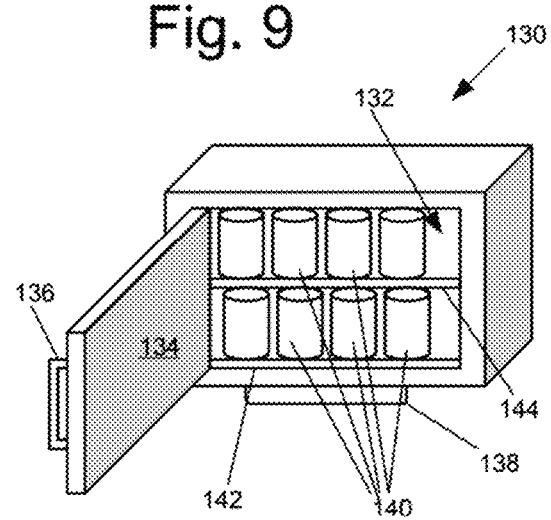
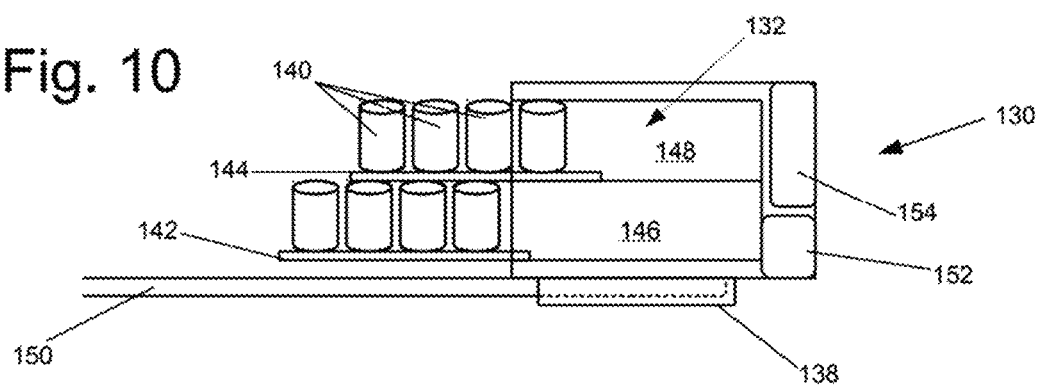
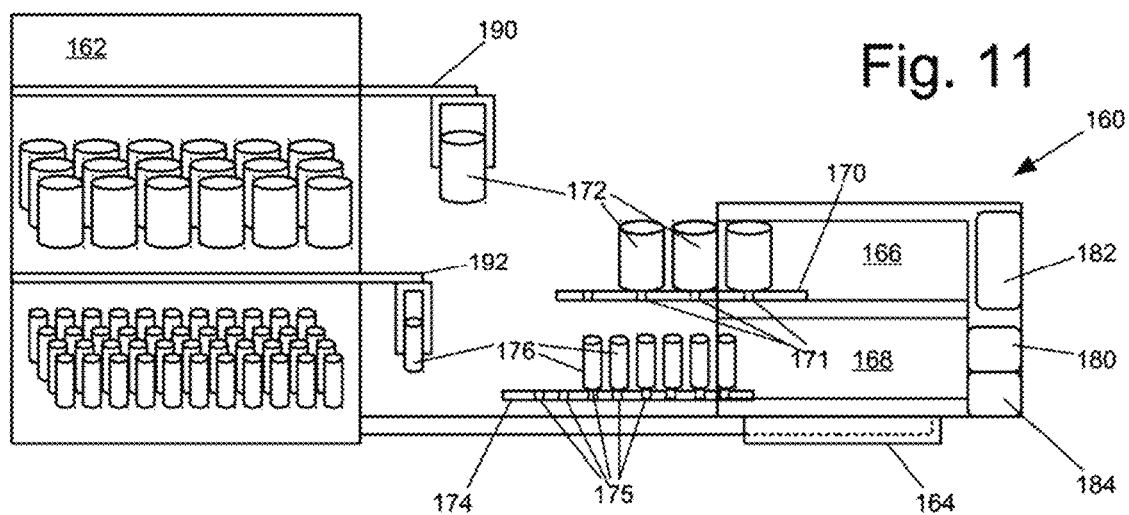

STORAGE COMPARTMENT FOR RENTAL GOLF CART

CROSS-REFERENCE TO RELATED APPLICATIONS

This application claims priority to U.S. Provisional Application Ser. No. 63/201,754 filed on May, 12, 2021 the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to a storage container for a golf cart. More particularly, the invention relates to a permanent or removable storage container for a rental golf cart having an internal climate-controlled compartment housing a plurality of retail items.

Description of the Related Art

Typical golf carts provide limited storage options, such as a wire basket mounted behind the seats. While such baskets are usually large enough to hold a at least a small cooler, golfers often use this basket to store other items. Most golf carts are not equipped with a container which fits within this wire basket which means that the golfer, if permitted by the golf course, must bring his or her own container, which is typically a conventional cooler or bag. This arrangement is not suitable for provision of consumable items to the golfer by the golf course operator.

To supply the golfers with these consumable products, most golf courses have golf "pro-shops" adjacent to the golf course which sell golfing accessories and equipment, canned or bottled beverages, packaged food or other items to the golfers for them to take with them while golfing. Golf courses may also have so-called "half-way" houses to sell food or the like on the course, or may provide motorized drink carts equipped to carry food and drinks on the course.

These half-way houses and drink carts must be manned, leading to increased costs. Further, they are frequently not available at the times that the golfer wishes to have a food or drink item, and/or may not be operation at certain times. Also, having the golfer stop at the half-way house or at a drink cart, delays the progress of the golfer which increases the time taken for each round of golf.

For example, golfers commonly have to wait until the drink cart reaches them to purchase various consumable goods. This wait can be long, and as a result, golfers often do not have the food, beverages, and other consumable items they want or need at the time that they want or need them. If a supply of these items was provided for them in their golf carts, golfers would be able to have such items whenever they want. This would likely improve golfer's performance as they would be able to maintain hydration in hot temperatures and have the necessary nutrients to maintain optimum energy levels while playing. They would also have ready access to golf accessories, such as gloves, tees, extra balls and other items when the need arises. As a result, they would likely consume more of these items and the golf course operators would generate greater revenues from sales of these items.

It is to be noted though, that some golfers who desire to have food, beverages, extra golf balls and other golf accessories while on a golf outing will bring a supply of these items with them from sources other than the golf club's pro-shop. With respect to food and beverages, however, many golf courses discourage or even prohibit golfers from bringing some of these items from outside the golf course because allowing golfers to do so could be in violation of local laws or regulations or could lead to damage of golf carts and/or the golf course because of the various containers used by golfers for these items. Further, allowing this practice deprives the golf course operators of revenues generated from the sales of such items. The golf course operator also is deprived of control over consumption of beverages, particularly alcoholic beverages, when golfers bring their own. Overindulgence in alcohol can result in damage to the golf cart, the golf course, and other golfers.

As such, the ability of golf course operators to generate revenues from sales of beverages, packaged foods and other consumable items is currently limited by what golfers can carry with them in the limited storage space on the golf cart, or which can be supplied to them by use of half-way houses, or by drink carts.

These limitations result in a lost opportunity to generate revenues from the sale of consumable items. Golf course operators are generally aware of the storage limitations of golf carts and the needs of golfers for various consumable items during a golf outing, and wish to adopt methods and devices which will increase the consumption of these consumable items. There is also a need to supply refreshments to golfers while also monitoring consumption of alcoholic beverages by patrons.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide a means for a golf course operator to offer retail sales of various items directly from a golfer's golf cart while a golfer is using a golf course.

BRIEF SUMMARY OF THE INVENTION

Disclosed are embodiments for rental golf carts that include a removable or permanent climate-controlled storage container, for example a mini fridge, that contains various retail items that may be removed by users of the rental golf cart during use which are then charged to a person's account with the renter of the golf cart. The storage container may include multiple compartments for storing retail items at different temperatures. For example, the storage compartment may include a refrigerator section for storing refrigerated drinks or snacks, a freezer section for storing frozen snacks and or drinks having high alcohol content, and a section held at ambient temperature for snacks or drinks to be consumed at ambient temperature. The storage container may also optionally include a heated section for storing warm or hot drinks or snacks such as coffee, tea, soup, or the like. The storage container may also optionally include a microwave or toaster oven, thereby allowing a patron to remove a frozen pizza from the freezer section and heat it up. The storage container may include its own power supply, may draw power from the rental golf cart, or may use a combination of both, to increase its battery life without unduly drawing power from the golf cart.

The storage compartment may also include a variety of safety features. For example, the storage compartment may include a lock operable by a key or by a code which may be typed into a keypad or onto a touchscreen. This prevents unauthorized purchases. In addition, the storage container may include a camera taking either video or still shots to verify the identity of a person removing retail items. A blood alcohol sensor may also be incorporated into the handle of the device. This blood alcohol sensor will unobtrusively detect a person's blood alcohol level by analyzing the sweat on the hand of the person opening the storage container. This is substantially less obtrusive, more convenient, and otherwise preferable to requiring use of a breathalyzer device. This also greatly reduces the likelihood of damage by or to a rental golf cart due to irresponsible alcohol consumption. If a blood alcohol level above a predetermined amount is detected by the sensor of the storage compartment, it may automatically deactivate the rental golf cart for a predetermined amount of time. Optionally, the storage compartment may warn users, for example by using an audio alarms such as one or more beeps, when it detects a blood alcohol level that has not yet reached but is approaching a predetermined amount that would prevent operation of the golf cart. This would allow renters of the golf cart to prevent deactivation of the golf cart and likely embarrassment, while also protecting the property of the renter of the golf cart, for example a country club. In the absence of an actual sensor for measuring blood alcohol level, the storage container could limit the number of alcoholic drinks removed from it within a predetermined time period. For example, a storage container could be programmed to only allow withdrawal of three alcoholic drinks per person every two hours.

The storage container may also include a plurality of sensors positioned to detect the presence of retail items at locations throughout the storage container. When the sensor detects that a retail item has been removed, it may automatically record the appropriate deduction to a golf cart renters account. When a golf cart having a storage container is returned to the renter, the golf cart and/or the storage container itself may be plugged into a docking station. The deductions to the renters account may be recorded at the docking station or may optionally be wirelessly transmitted. Furthermore, the docking station may also be automated to automatically resupplied the storage container with the removed items. The docking station may also optionally replace items in a storage container and/or fill a storage container according to a request prior to renting of a golf cart. For example, if the renter of a golf cart only prefers a certain type of drink, such as beer versus lemonade, the docking station may adjust the contents of the storage container accordingly.

It is therefore an object of the present invention to provide a golf cart having a removable or permanent storage container for storing retail items in a climate-controlled environment.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 8 is a front perspective view of another alternative embodiment of a removable storage compartment for a rental golf cart in accordance with principles of the invention;

FIG. 9 is a front perspective view of another alternative embodiment of a removable storage compartment with its door open for a rental golf cart in accordance with principles of the invention;

FIG. 10 is a side cross-sectional view of another alternative embodiment of a removable storage compartment for a rental golf cart removably attached to an ancillary docking station in accordance with the principles of the invention;

FIG. 11 is a side cross-sectional view of another alternative embodiment of a removable storage compartment for a rental golf cart removably attached to an ancillary docking station in accordance with principles of the invention;

DETAILED DESCRIPTION

Figure 1:
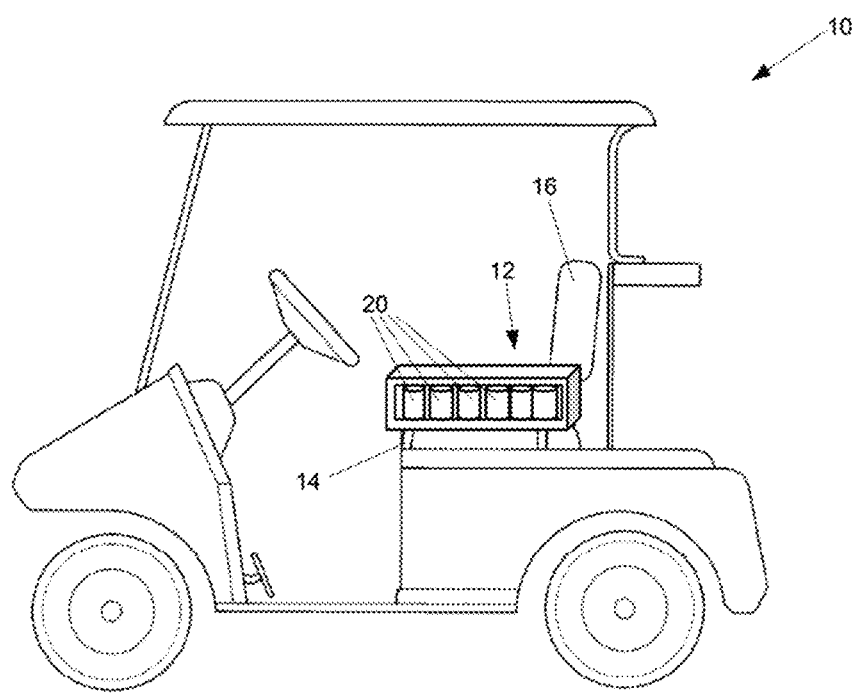
FIG. 1 is a side view of a golf cart having a removable storage container in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions, reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise. It should also be noted that the invention is described primarily in terms of a storage container on a rental golf cart. Those skilled in the art will appreciate that the invention is also suitable in other applications. For example, it may be used with a golf cart owned by an individual and it is not limited to rental golf carts. Similarly, the invention could also be used with other rental vehicles such as for example rental moving vans and moving trucks commonly rented in the short term. Similarly, the storage containers of the invention could also be used with boat rentals, airplane rentals and any other vehicle rentals. The storage containers could also optionally be utilized at rental pavilions commonly found at parks and recreation centers.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

FIG. 1 shows a typical golf cart 10 in accordance with principles of the invention. The golf cart 10 has a storage container 12 attached to an armrest 14 adjacent to the driver's seat 16. The storage container 12 is removably attached to the armrest 14 and is easily removed and reattached. The container 12 has transparent or semi-transparent sliding doors 18 and contains a plurality of retail items 20. In this embodiment, the retail items are 12-ounce cans of soda, beer or other potable liquids. In FIG. 1, the doors 18 face away from the golf cart. The container 12 may optionally be attached to the armrest 14 such that the doors 18 face inward, allowing an occupant of the golf cart to readily access the retail items 20. Optionally, containers 12 may be attached to one or both armrests and may also optionally be located in other regions of the golf cart 12.

Figure 2:
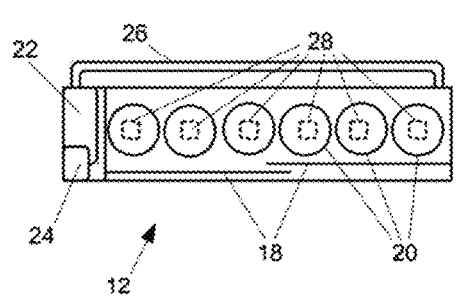
FIG. 2 is a top cross-sectional view of a storage container in accordance with principles of the invention.
Figure 3:
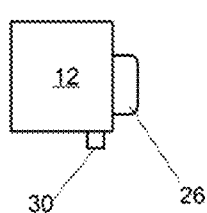
FIG. 3 is a side elevation view of a storage container in accordance with principles of the invention.

FIGS. 2 and 3 show the storage container 12 in more detail. The storage container 12 includes a climate-controlled device 22 controlled by a microcontroller 24. The storage container 12 can be temporarily affixed to the golf cart by sliding over a bracket 26 on one side of the storage container 12. The storage container 12 also includes a plurality of sensors 28 for detecting the presence of a retail item 20. If one or more retail items 20 are removed from the container 12, the sensors 28 will detect the removal so that it can be automatically tallied and charged to an appropriate account. The container 12 also includes a plug 30 that may be inserted into a socket in the golf cart 10, allowing the storage container 12 to draw power from the golf carts battery. Those skilled in the art will appreciate that the plug 30 may also perform a variety of other functions, such as identifying which particular golf cart it has been attached to.

Figure 4:
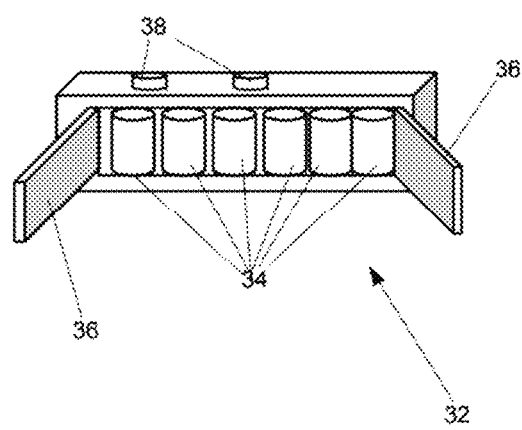
FIG. 4 is a perspective view of an alternative embodiment of a storage container in accordance with the principles of the invention.

FIG. 4 shows an alternative embodiment of a storage container 32 also housing a plurality of retail items 34. Storage container 32 includes a pair of doors 36 that swing outward to allow access to the interior of the container 32. The doors 36 may be held in place by magnets when they are closed. Storage container 32 also includes manual control knobs 38 that may serve a variety of purposes. For example, one of the knobs 38 may be utilized to control the interior temperature of the storage container 32 while the other is used to lock or unlock the storage container 32.

Figure 5:
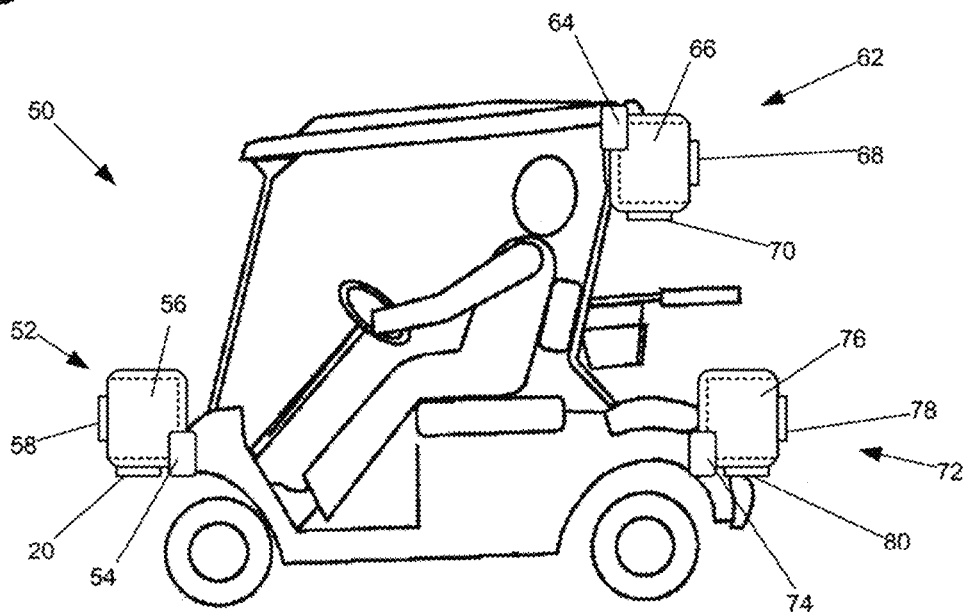
FIG. 5 is a side view of a rental golf cart having removable storage compartments in accordance with the principles of the invention.

FIG. 5 shows a typical rental golf cart 50 in accordance with principles of the invention. The rental golf cart 50 shown in FIG. 5 has three separate storage containers removably attached. A storage container 52 is removably attached to a docking port 54 at the front of the golf cart 50, has an internal climate-controlled compartment 56 which may be open by a handle 58, and includes a second docking port 60 for attaching to an ancillary docking station. Another storage container 62 is removably attached to a docking port 64 located at the back of the roof of the golf cart 50, has an internal climate-controlled compartment 66 which may be opened by a handle 68, and includes a second docking port 70 for attaching to an ancillary docking station. Another storage container 72 is removably attached to a docking port 74 located at the bottom of the rear of the golf cart 50, has an internal climate-controlled compartment 76 which may be open by handle 78 and includes a second docking port 80 for attaching to an ancillary docking station. FIG. 5 illustrates the possibility that storage containers may be easily positioned at various locations on a golf cart, it may often be desirable to only provide a single storage container on a golf cart at a time. However, if two or more persons are using a golf cart, they may each desire their own individual storage container. FIG. 5 should not be viewed as limiting the locations at which a storage container could be attached to a rental golf cart 50 or other vehicles and is intended only to illustrate the versatility of some of the components of the invention.

Figure 6:
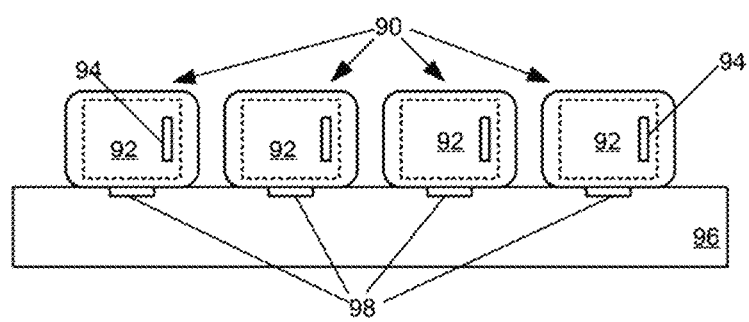
FIG. 6 is a front elevation view of an ancillary docking station for removable storage compartments for rental golf carts in accordance with the principles of the invention.

FIG. 6 shows a plurality of storage containers 90, each having an internal compartment 92 accessible by pulling on a handle 94 and which are removably attached to an ancillary docking station 96 by their respective docking ports 98. The docking ports 98 may be used to charge batteries within the storage containers 90 used to supply power to components which control the climate within the containers 90. The docking ports 98 may also be used to transmit a wide variety of information to the ancillary docking station so that it may be analyzed by various software applications. For example, the storage containers may record information such as the numbers and types of items removed, frequencies at which various items are removed, the times of day at which items are removed, the total amount of energy consumed while they were in use on a golf cart or other device, and the like. Those skilled in the art will appreciate that such information can be immensely valuable. The data relating to the types and frequencies of various products consumed can also be combined with demographic information regarding the persons renting the various golf carts to provide valuable information that allows the renter of the golf cart to optimize inventory, maximize sales, and optimize price points. Microcircuits in the storage containers 90 may also be used to record information regarding the various rental carts themselves such as energy use and motor strain throughout the course of the rental. If the rental carts include GPS devices, the storage containers can also record data regarding the motor and energy use throughout a golf course. This information may be used to identify regions of the golf course requiring improvements, likely to result in injury or damage to golf carts that can be improved as well as other information.

Figure 7:
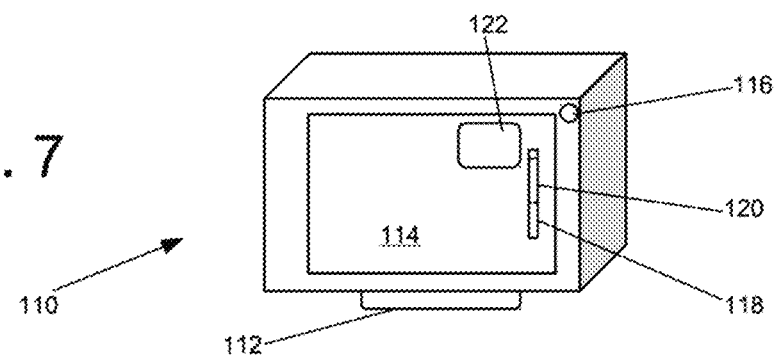
FIG. 7 is a perspective view of an alternative embodiment of a removable storage compartment for a rental golf cart in accordance with the principles of the invention.

FIG. 7 shows a storage container 110 which includes various safety features. Container 110 has a docking port 112, and an internal compartment, not shown, accessible by a door 114. A camera 116 is positioned near the top of the container 110 proximal to the handle 118 to the door 114. The camera 116 may be utilized to record either video or a still shot when the handle 118 is grabbed and/or when the door 114 is opened. This may be useful should a dispute arise regarding when or who someone accessed the internal compartment of the storage container 110. For example, if two persons are utilizing a rental cart and do not remember who purchased a particular item, the records from the camera 116 may be used to identify which operator removed what objects at what time. The door 114 includes a computer control panel 112 which in this embodiment is a touchscreen panel. The touchscreen panel may be utilized to enter an alphanumeric code required to open the container 110. The control panel 122 may also display information such as the total purchases made so that an operator does not spend too much money. The control panel 122 may also be utilized to control the temperature in various sub compartments with the container 110. An operator may also optionally choose to limit himself or herself to a certain number of snacks or drinks for health or other reasons. The control panel 122 may display the number of items remaining on this limiting list. Additionally, in this embodiment, the handle 118 also includes a sensor 120 which detects the blood alcohol level of a person grasping the handle 118 by performing chemical tests on the sweat of the person's hand. While it is known that sweat may be used to determine blood alcohol level, it is often impractical to obtain sweat. However, when a golf cart is being used, the operators are typically golfing, which almost always results in sweat being present on a person's hands. The heat resulting in sweat is also the heat often resulting in a person's desire for a refreshing beverage.

Thus, in this situation, such a blood alcohol level detection sensor 120 can be practical. If a blood alcohol level is close to but below a predetermined amount, the container 110 may emit a warning signal such as a beep or series of beeps to notify the user that additional alcohol consumption may result in the golf cart being shut down or temporarily disabled. Optionally, a warning may be visually displayed on the control panel 82 to provide a more subtle alerts that a person is approaching a blood alcohol level limit. This information may be useful in decreasing injury or damage to golf carts due to the overconsumption of alcoholic beverages. When the sensor 120 detects blood alcohol above a predetermined level, the golf cart will shut down for a predetermined amount of time, for example one hour. The storage container 110 may also optionally send a signal to the golf pro shop or other remote location notifying persons responsible for the golf carts that a golf cart has been disabled due to a high reading of blood alcohol level. The remote location may have the option to turn the golf cart back on, or keep it disabled. For example, if another person with a lower blood alcohol level in the golf cart is willing to accept responsibility, then the remote location may authorize that second person to assume responsibility and have control of the re-activated golf cart.

Providing the ability to monitor blood alcohol level, as opposed to number of alcoholic drinks purchased, allows the operators of rental golf carts to more accurately and securely monitor the safety of the golf course. It is well known that some golfers will bring undisclosed alcohol, in a flask or small bottle, when golfing. Merely counting the number of alcoholic beverages consumed would not alert the container 110 to the fact that a golf cart operator has become intoxicated by alcohol he or she brought with him or her. Thus, the incorporation of the blood alcohol level sensor improves current automated methods of monitoring alcohol consumption. The blood alcohol sensor may also be inconspicuous, as some golfers may not enjoy feeling like they are being obviously monitored.

FIGS. 8-10 show an alternative embodiment of a storage container 130 in accordance with principles of the invention. Storage container 130 has an internal compartment 132 accessible through a door 134 operable by a handle 136. An ancillary docking port 138 on the bottom allows it to be removably attached to an ancillary docking station as described above. Those skilled in the art will appreciate that the storage container 130 may optionally include any of the specialized features shown in FIG. 7 and may also be attached to a rental golf cart or other device as shown in FIGS. 1 and 5. The internal compartment 132 has a plurality of retail items 140 arranged on two shelves 142 and 144, located in sub compartments 146 and 148, respectively. Sub compartments 146 and 148 may be climate-controlled at the same or different temperatures. Retail items 140 may be the same item or may be a plurality of different items.

FIG. 10 shows the storage container 130 docked at an ancillary docking station 150. In this embodiment, the shelves 142 and 144 are slidably removable at least partially to facilitate counting of the retail items 140 and replacing or interchanging them. This may be done manually or mechanically. When the storage container 130 is docked at the ancillary docking station 150, its battery 152 for powering its climate controlling mechanism 154 may be recharged.

FIG. 11 shows another alternative embodiment of a storage container 160 attached to an ancillary docking station 162 by its ancillary docking port 164. The storage container 160 has two separate sub compartments 166 and 168. In this embodiment, the upper sub compartment 166 is used as a refrigerator while the lower sub compartment 168 is a freezer. The upper sub compartment 166 has an outward sliding shelf 170 which includes a plurality of sensors 171 for detecting the retail items 172 supported on the shelf 170. Similarly, the lower sub compartment 168 has an outward sliding shelf 174 having a plurality of sensors 175 for detecting retail items 176. A microcontroller 180 and a climate control mechanism 182 are powered by a battery 184 which may be recharged by the ancillary docking port 164 and may also be supplied power by a golf cart to which it is attached. When one of the sensors 171 or 175 detects that a retail item 172 or 176 has been removed, the microcontroller records that change and may transmit that information to the ancillary docking station, via a wireless transmitter, and/or may display that information on a control panel on the exterior of the container 160. The docking station 162 of this embodiment includes an inventory of retail items 172 and a separate inventory of retail items 176. By way of example, retail items 172 may be beverages while retail items 176 may be ice cream snacks. When the container 160 is docked at the ancillary docking station 162, its shelves 170 and 174 may be automatically slid out and automated robotic arms 190 and 192 may automatically refill the storage compartment by placing additional retail items 172 and 176 at appropriate locations on the appropriate shelves. Optionally, robotic arms 190 and 192, or similar devices, may be used to completely replace all the items or rearrange the items within a container. The ancillary docking station 162 may also verify that information recorded by and/or stored on the microcontroller 180 is accurate. For the case where the renter of a golf cart may have removed a retail item 176 and then reinserted it in a position where one of the sensors did not record its presence.

Figure 12:
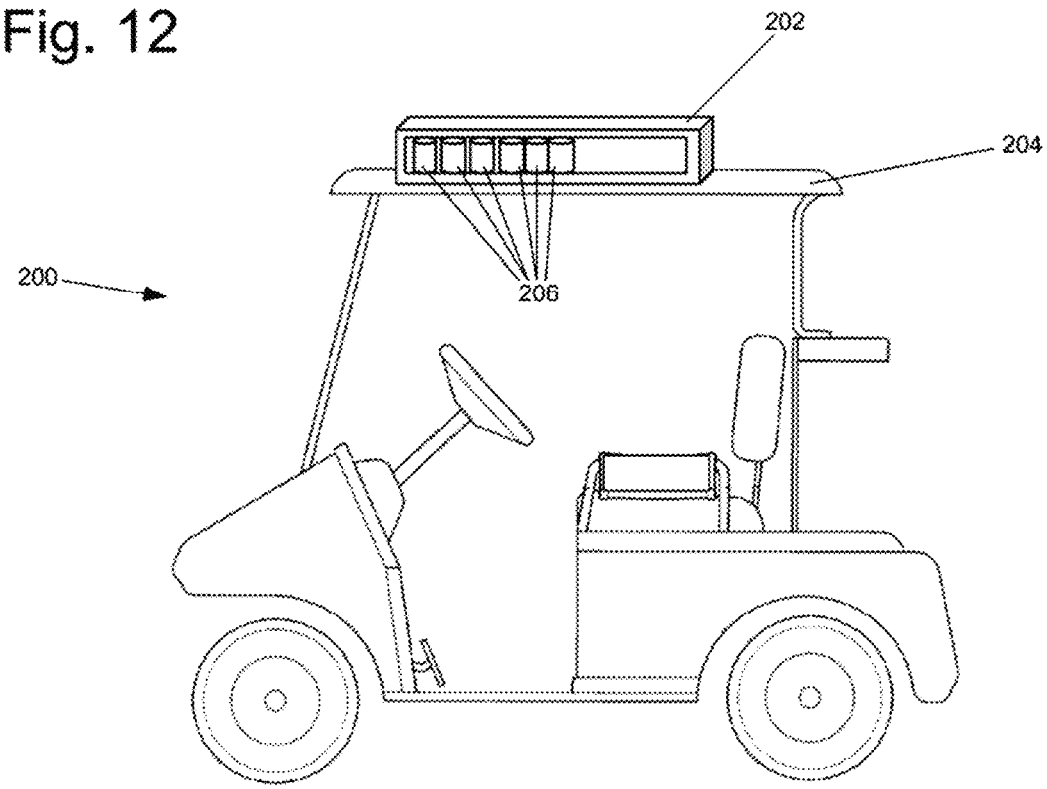
FIG. 12 is a side view of alternative embodiment of a golf cart having a storage container in accordance with the principles of the invention.
Figure 13:
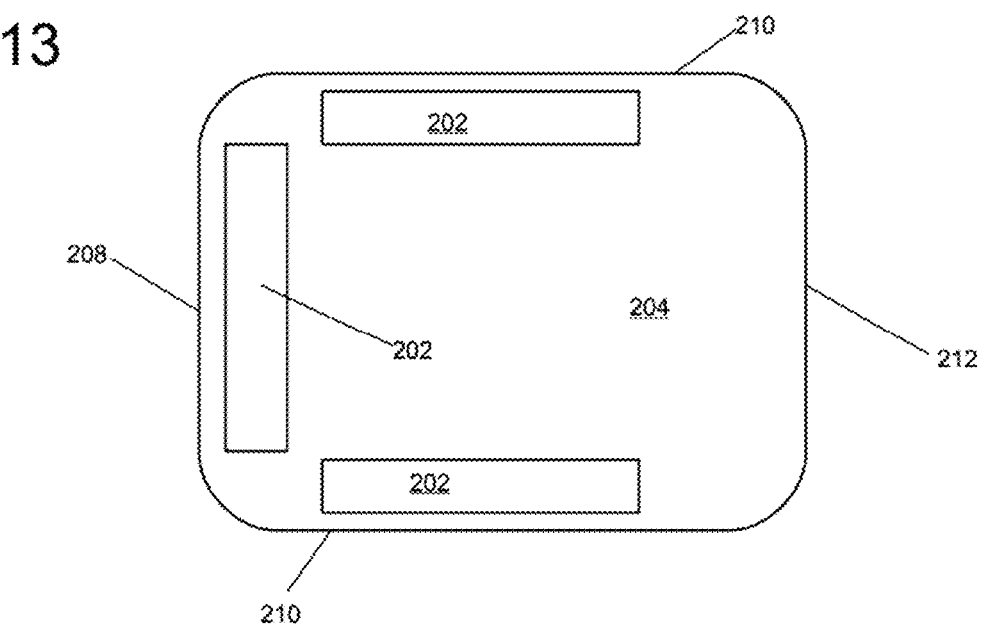
FIG. 13 is a top plan view of a golf cart canopy having a plurality of attached storage containers in accordance with principles of the invention.

FIG. 12 shows another alternative embodiment of a golf cart 200 having a removable climate-controlled storage container 202. In this embodiment, the storage container 202 is removably affixed to the canopy 204 of a golf cart 200. The storage container 202 is elongate compared to the other storage containers described herein. However, those skilled in the art will appreciate that container 202 may include any of the various storage container features described herein. I.e., the storage container 202 may include access controls, sensors for detecting the presence of retail items 206, various types of doors and plugs for connecting to the battery powering the golf cart 200. FIG. 13 shows the canopy 204 of the golf cart 200 wherein two additional storage containers 202 have been attached. One of the storage containers 202 is located near the front 208 of the canopy 204, while the other two containers 202 are located near the sides 210. Optionally, a storage container may also be attached near the back 212 of the canopy 204. In addition, the various storage containers may be attached to the bottom of the canopy. Optionally, storage containers may be attached to both the top and the bottom of the canopy 204. Those skilled in the art will appreciate that the location and three-dimensional shape of the storage containers may be altered without falling outside the scope of the invention.

Figure 14:
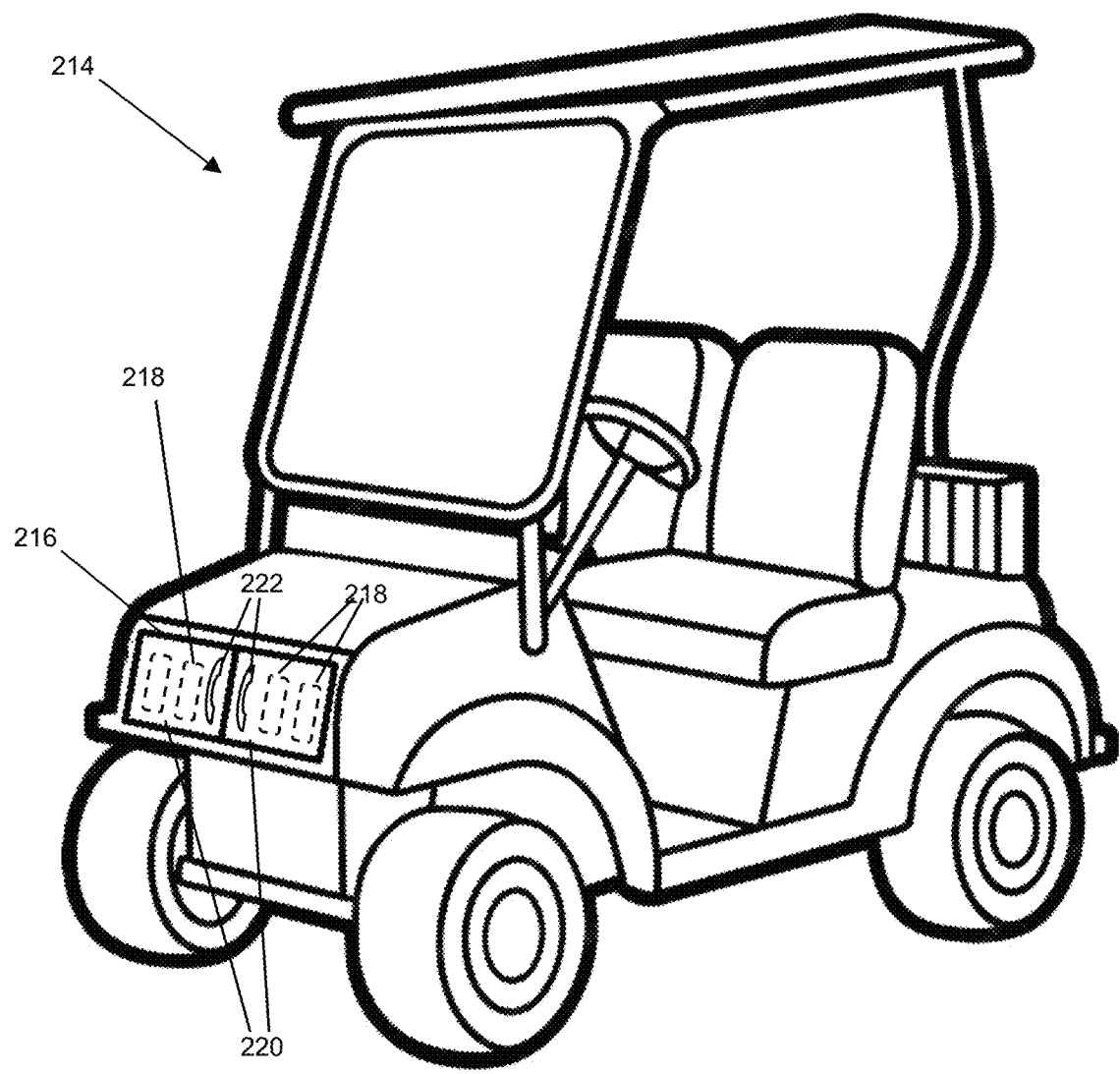
FIG. 14 is a perspective view of a golf cart having a removable storage container in accordance with the principles of the invention.

FIG. 14 shows another alternative embodiment of a golf cart 214 having a permanently installed climate-controlled storage container 216. In this embodiment, the storage container 216 is permanently built into the fender and front region of a golf cart 214. The built-in storage container 216 has an internal component that is accessible by two plexiglass doors 220 which can be opened using the handles 222. The plexiglass doors 220 are transparent to allow the golfer to see the products 218 inside, such as, snacks, sodas, beer, other alcoholic beverages, lemonade, and the like. Additionally, those skilled in the art will appreciate that the storage container 214 may optionally include any of the specialized features shown in FIG. 7, such as, a blood alcohol sensor on the handle, a camera to identify which operator removed what objects at what time, a control panel to identify how many beverages have been removed, and a touchscreen panel to lock or unlock the container.

In use, all the exemplary embodiments shown will allow golf course operators to generate more revenues from the sales of beverages, packaged foods, and other consumable items. The climate-controlled storage will also help golfers to stay hydrated and fueled during hot and/or long periods out on the golf course. It may also incentivize golfers to stay on the course for a longer period of time, or favor golf courses that have this system installed into the golf carts because of the convenience it offers. Additionally, the blood alcohol sensor on the compartment door handle may be useful in decreasing the amount of injuries to people or golf carts, due to the overconsumption of alcoholic beverages.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A climate-controlled, storage compartment for rental golf cart comprising:
 a golf cart having an electrical power and communication port;
 a climate-controlled storage container attached to the electrical power and communication port and storing a plurality of removable retail objects;
 wherein the climate-controlled storage container includes sensors for detecting the presence of retail items within the container, and the climate-controlled storage container is capable of recording and transmitting information regarding the number and type of retail items removed from the container while the container is attached to the rental golf cart;
 wherein the climate-controlled storage container includes a handle having a blood alcohol level sensor that analyzes the sweat on the person's hand who is opening the compartment, and which does not permit opening of the storage container when the sensor detects a blood alcohol level in the golfer's sweat above a predetermined amount.

2. The climate-controlled storage compartment for rental golf cart of claim 1 wherein the climate-controlled container is removably attachable to an ancillary docking station.

3. The climate-controlled storage compartment for rental golf cart of claim 2 wherein the climate-controlled storage container includes a coded lock and does not permit opening of the storage container unless a predetermined code is entered.

4. The climate-controlled, storage compartment for rental golf cart of claim 3 wherein the climate-controlled storage container includes an alarm, such as one or more beeps, when the blood alcohol sensor in the handle detects a blood alcohol level that has not yet reached but is approaching a predetermined amount that would prevent operation of the golf cart.

5. The climate-controlled, storage compartment for rental golf cart of claim 4 wherein the climate-controlled storage container includes a camera that records a video or still shot image when a retail item is removed from the container.

6. The climate-controlled, storage compartment for rental golf cart of claim 5 wherein an ancillary docking station automatically replaces retail items removed from the storage container while the container is attached to the rental golf cart.

7. A climate-controlled, storage compartment for rental golf cart comprising:
- a golf cart having an electrical power and communication port;
- a built in climate-controlled storage container attached to the electrical power and communication port and storing a plurality of removable retail objects;
- wherein the climate-controlled storage container includes sensors for detecting the presence of retail items within the container, and the climate-controlled storage container is capable of recording and transmitting information regarding the number and type of retail items removed from the container while the container is attached to the rental golf cart;
- wherein the climate-controlled storage container includes a handle having a blood alcohol level sensor that analyzes the sweat on the person's hand who is opening the compartment, and which does not permit opening of the storage container when the sensor detects a blood alcohol level in the golfer's sweat above a predetermined amount.

8. The climate-controlled, storage compartment for rental golf cart of claim 7 wherein the climate-controlled storage container includes a coded lock and does not permit opening of the storage container unless a predetermined code is entered.

9. The climate-controlled, storage compartment for rental golf cart of claim 7 wherein the climate-controlled storage container includes an alarm, such as one or more beeps, when the blood alcohol sensor in the handle detects a blood alcohol level that has not yet reached but is approaching a predetermined amount that would prevent operation of the golf cart.

10. The climate-controlled, storage compartment for rental golf cart of claim 9 wherein the climate-controlled storage container includes a camera that records a video or still shot image when a retail item is removed from the container.

11. The climate-controlled, storage compartment for rental golf cart of claim 10 wherein an ancillary docking station automatically replaces retail items removed from the storage container while the container is attached to the rental golf cart.

12. A method of manufacturing a climate-controlled, storage compartment for rental golf cart comprising:
- providing a golf cart having an electrical power and communication port;
- affixing a climate-controlled storage container to the electrical power and communication port;
- stocking a plurality of removable retail objects inside the climate-controlled storage container;
- wherein the climate-controlled storage container includes sensors for detecting the presence of retail items within the container, and the climate-controlled storage container is capable of recording and transmitting information regarding the number and type of retail items removed from the container while the container is attached to the rental golf cart;
- wherein the climate-controlled storage container includes a handle having a blood alcohol level sensor that analyzes the sweat on the person's hand who is opening the compartment, and which does not permit opening of the storage container when the sensor detects a blood alcohol level in the golfer's sweat above a predetermined amount.

13. The method of manufacturing a climate-controlled, storage compartment for rental golf cart of claim 12 wherein the climate-controlled storage container includes a coded lock and does not permit opening of the storage container unless a predetermined code is entered.

14. The method of manufacturing a climate-controlled, storage compartment for rental golf cart of claim 13 wherein the climate-controlled storage container includes an alarm, such as one or more beeps, when the blood alcohol sensor in the handle detects a blood alcohol level that has not yet reached but is approaching a predetermined amount that would prevent operation of the golf cart.

15. The method of manufacturing a climate-controlled, storage compartment for rental golf cart of claim 14 wherein the climate-controlled storage container includes a camera that records a video or still shot image when a retail item is removed from the container.

16. The method of manufacturing a climate-controlled, storage compartment for rental golf cart of claim 15 wherein an ancillary docking station automatically replaces retail items removed from the storage container while the container is attached to the rental golf cart.

* * * * *